United States Patent
Costilla et al.

(10) Patent No.: US 11,037,154 B1
(45) Date of Patent: Jun. 15, 2021

(54) DETERMINING PAYMENT DETAILS BASED ON CONTEXTUAL AND HISTORICAL INFORMATION

(71) Applicant: Wells Fargo Bank, N.A., San Francisco, CA (US)

(72) Inventors: Gerardo Costilla, San Francisco, CA (US); Marria Wairnola Rhodriquez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 311 days.

(21) Appl. No.: 15/991,462

(22) Filed: May 29, 2018

(51) Int. Cl.
*G06Q 20/40* (2012.01)
*G06Q 20/10* (2012.01)
*G06Q 20/42* (2012.01)
*G06K 9/00* (2006.01)
*G06K 9/34* (2006.01)
*G10L 15/26* (2006.01)

(52) U.S. Cl.
CPC ... *G06Q 20/40145* (2013.01); *G06K 9/00288* (2013.01); *G06K 9/344* (2013.01); *G06Q 20/10* (2013.01); *G06Q 20/407* (2013.01); *G06Q 20/42* (2013.01); *G10L 15/26* (2013.01); *G06K 2209/01* (2013.01)

(58) Field of Classification Search
USPC ....................................................... 705/35, 39
See application file for complete search history.

(56) References Cited

U.S. PATENT DOCUMENTS

| | | | | |
|---|---|---|---|---|
| 5,940,799 | A * | 8/1999 | Bruckert | G06F 21/83 704/273 |
| 8,438,089 | B1 * | 5/2013 | Wasserblat | G06Q 40/02 705/35 |
| 8,626,659 | B1 * | 1/2014 | Bowman | G06Q 20/24 705/42 |
| 9,886,954 | B1 * | 2/2018 | Meacham | G10L 21/028 |
| 10,423,948 | B1 * | 9/2019 | Wilson | G06Q 20/3255 |
| 2009/0240626 | A1 * | 9/2009 | Hasson | G06Q 20/3278 705/75 |
| 2011/0231310 | A1 * | 9/2011 | Roberts | G06Q 20/32 705/40 |
| 2012/0233072 | A1 * | 9/2012 | Calman | G06Q 40/02 705/44 |

(Continued)

OTHER PUBLICATIONS

Video Analytics Revisited Chodhary, Chaudury (Year: 2015).*

*Primary Examiner* — William E Rankins
(74) *Attorney, Agent, or Firm* — Shumaker & Sieffert, P.A.

(57) ABSTRACT

A computing system may be configured to determine payment details for funds transfers from unstructured sets of data. The system may maintain historical transaction information associated with each of a plurality of users. The system may receive data associated with a transaction. The system may identify a user associated with the data, wherein the user is one of the plurality of users. The system may determine, based on contextual information of the data and the historical transaction information associated with the user, payment details about the transaction. The payment details may include a payment amount and one or more recipients. The system may execute a funds transfer for the payment amount from a source account associated with the user to one or more destination accounts associated with the one or more recipients.

20 Claims, 4 Drawing Sheets

(56) References Cited

U.S. PATENT DOCUMENTS

| | | | |
|---|---|---|---|
| 2013/0173466 A1* | 7/2013 | Lepisto | G06Q 20/40145 |
| | | | 705/44 |
| 2014/0019352 A1* | 1/2014 | Shrivastava | G06Q 20/326 |
| | | | 705/41 |
| 2014/0136346 A1* | 5/2014 | Teso | G06Q 30/06 |
| | | | 705/14.72 |
| 2015/0012426 A1* | 1/2015 | Purves | G02B 27/017 |
| | | | 705/41 |
| 2015/0073907 A1* | 3/2015 | Purves | G06Q 20/32 |
| | | | 705/14.58 |
| 2015/0081531 A1* | 3/2015 | Caldwell | G06Q 20/38 |
| | | | 705/39 |
| 2015/0081548 A1* | 3/2015 | Robinett | G06Q 20/32 |
| | | | 705/44 |
| 2016/0109954 A1* | 4/2016 | Harris | G06F 3/011 |
| | | | 345/156 |
| 2016/0117670 A1* | 4/2016 | Davis | G06Q 20/386 |
| | | | 705/39 |
| 2016/0180316 A1* | 6/2016 | Wang | G06Q 20/32 |
| | | | 705/39 |
| 2016/0180318 A1* | 6/2016 | Brooks | G06Q 20/10 |
| | | | 705/39 |
| 2016/0189119 A1* | 6/2016 | Bowman | G06Q 20/3821 |
| | | | 705/39 |
| 2017/0193468 A1* | 7/2017 | Chougule | G06Q 20/223 |
| 2018/0096355 A1* | 4/2018 | Studnicka | G06Q 20/027 |
| 2018/0174152 A1* | 6/2018 | Fortin | G06Q 20/40145 |

\* cited by examiner

DETERMINING PAYMENT DETAILS BASED ON CONTEXTUAL AND HISTORICAL INFORMATION

TECHNICAL FIELD

The techniques of this disclosure relate to computerized processing of data, such as processing of data relating to funds transfers.

BACKGROUND

Financial institutions such as banks and credit unions and the like may provide options for customers of those financial institutions to transfer money. For example, in addition to transferring money in person (e.g., by talking with a teller of the financial institution), financial institutions may enable customers to transfer money over one or more remote interfaces, such as using an interface provided over the internet. The financial institutions may enable such monetary transfers between two financial accounts associated with the same user, and/or between two financial accounts associated with different users. Further, the financial institution may enable money transfers between two financial accounts of the financial institution and/or between financial accounts of different financial organizations.

SUMMARY

In general, this disclosure describes techniques for determining payment details for funds transfers from unstructured sets of data. A computing system that is associated with a financial institution may execute some or all of these techniques. The computing system may maintain a database of historical transaction information on a plurality of users to determine payment details for funds transfers from unstructured sets of data. For example, this computing system may receive a set of data that is associated with a transaction. The transaction may relate to a meal at a restaurant, a round of drinks at a social event, an amount of groceries or supplies for a communal event, or the like. The data may be substantially unstructured and unsorted such that the data has minimal metadata associated with it. The data may include video data, audio data, static imagery data, or the like. The computing system may identify that the data is associated with a user of the plurality of users of the database of historical transaction information. The computing system may analyze the data to determine contextual information of the data. For example, contextual information may include people that are recorded in the data, spoken words or text that is captured in the data, scenery or environmental objects of the data, or the like. Using both the historical transaction information of the user and the contextual information of the data, the computing system may determine payment details for the transaction, such as one or more payment amounts to be sent to one or more monetary recipients from a source financial account of the user at the financial institution to one or more destination accounts for the one or more recipients. The computing system may use these payment details to execute one or more funds transfers.

In one example, this disclosure is directed to a computer-implemented method for determining payment details for funds transfers from unstructured sets of data, the computer-implemented method including maintaining, by a computing system, historical transaction information associated with each of a plurality of users. The method further includes receiving, by the computing system, data associated with a transaction. The method further includes identifying, by the computing system, a user associated with the data, wherein the user is one of the plurality of users. The method further includes determining, by the computing system and based on contextual information of the data and the historical transaction information associated with the user, payment details for the transaction. The payment details include a payment amount and one or more recipients. The method further includes executing, by the computing system, a funds transfer for the payment amount from a source account associated with the user to one or more destination accounts associated with the one or more recipients.

In another example, this disclosure is directed to a computing device comprising at least one processor and a memory coupled to the processor, the memory storing instructions that, when executed, cause the at least one processor to maintain historical transaction information associated with each of a plurality of users. Executing the instructions of the memory of the computing device further causes the processor to receive data associated with a transaction. Executing the instructions of the memory of the computing device further causes the processor to identify a user associated with the data, wherein the user is one of the plurality of users. Executing the instructions of the memory of the computing device further causes the processor to determine, based on contextual information of the data and the historical transaction information associated with the user, payment details for the transaction. The payment details include a payment amount and one or more recipients. Executing the instructions of the memory of the computing device further causes the processor to execute a funds transfer for the payment amount from a source account associated with the user to one or more destination accounts associated with the one or more recipients.

In a further example, this disclosure is directed to a non-transitory computer-readable storage medium (CRM) having stored thereon instructions that, when executed, cause a processor to maintain historical transaction information associated with each of a plurality of users. Executing the instructions of the CRM further causes the processor to receive data associated with a transaction. Executing the instructions of the CRM further causes the processor to identify a user associated with the data, wherein the user is one of the plurality of users. Executing the instructions of the CRM further causes the processor to determine, based on contextual information of the data and the historical transaction information associated with the user, payment details for the transaction. The payment details include a payment amount and one or more recipients. Executing the instructions of the CRM further causes the processor to execute a funds transfer for the payment amount from a source account associated with the user to one or more destination accounts associated with the one or more recipients.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
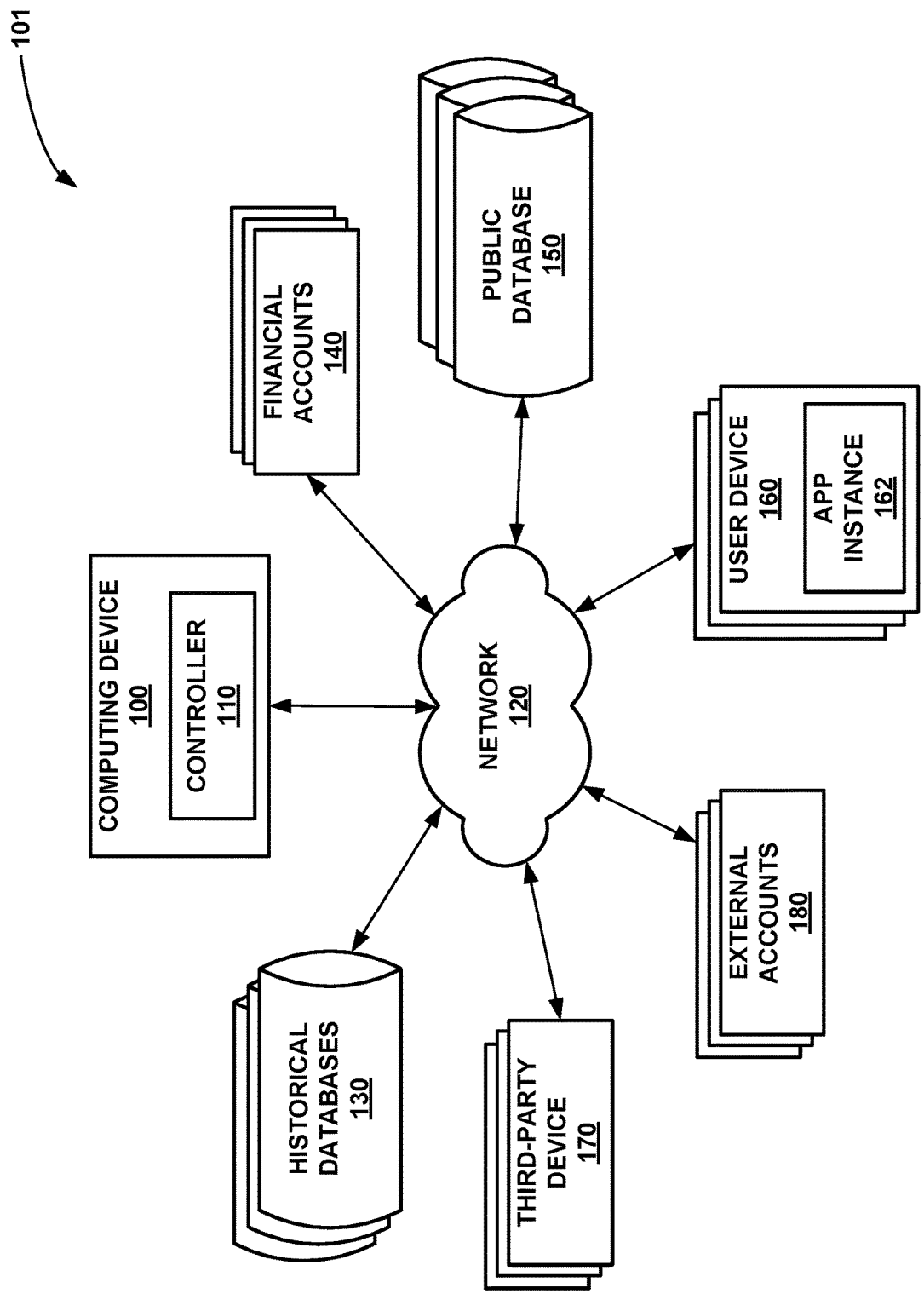
FIG. 1 is a block diagram illustrating an example payment detail determination system that includes a computing device, a customer device, and one or more databases, in accordance with the techniques of this disclosure.

Aspects of this disclosure relate to a computing system for determining payment details for funds transfers from unstructured sets of data. A computing system that is associated with a financial institution may execute some or all of these techniques. For example, the techniques of this disclosure may be performed by a computing system that includes one or more back-end software module hosted on one or more "server farms" of the financial institution. This computing system is configured to analyze received and/or gathered data to identify contextual information of the data and relevant historical transaction information, determine payment details regarding the data based on the contextual information and relevant historical transaction information, and execute a transfer of funds from a source account to a destination account that corresponds with the payment details.

Financial institutions may regularly receive and have access to sets of unstructured data. For example, different application instances (herein referred to as app instances) of mobile applications (herein referred to as mobile apps) developed by the financial institution and downloaded and installed on various user devices (e.g., mobile phones or laptops or the like) may have access to substantial amounts of unstructured data. These app instances may both have general access through privileges provided to the app instances by the user as well specific access in response to a user uploading such data to the app instances. However, in certain examples a version of a computing system for a financial institution may be unable to determine a full set of payment details. As a result of this, such a computing system may be unable to execute a funds transfer. For example, a set of data might not include a destination account to which funds should be transferred to execute the funds transfer. In such examples, the computing system may need to rely on a user to provide some or all of the payment details through a separate user interface (e.g., separate to the initial submission of unstructured data) in order to gather enough information to execute a funds transfer related to the data.

Aspects of this disclosure may address this technical problem. For example, aspects of this disclosure relate to a computing system maintaining a database of historical transaction information as associated with a plurality of users. Maintaining the database may include storing associations between users, previously executed funds transfers, previous contextual information of the funds transfers, or the like. Further, when this computing system receives unstructured data, the computing system may identify a user of the database of historical transaction information that is associated with the unstructured data as well as identifying contextual information of the data. Using this historical transaction information and contextual information, the computing system may be able to substantially determine a complete set of payment details for the data, such that a user may only need to review or approve the payment details (e.g., rather than the user explicitly providing any payment details) for the computing system to successfully execute the funds transfer.

FIG. 1 is a block diagram illustrating system 101 in which an example computing device 100 determines payment details for funds transfers from unstructured sets of data. As discussed herein, controller 110 of computing device 100 may analyze data to identify contextual information and relevant historical transaction information to determine payment details and then execute funds transfers according to the payment details. Though controller 110 is predominantly discussed in this disclosure as a single entity as hosted on a single computing device 100 for purposes of clarity, it is to be understood that in other examples one or more aspects or actions attributed to controller 110 may be executed by other components of system 101, or may be executed by a plurality of controllers similar to controller 110 as hosted by a plurality of computing devices similar to computing device 100. Put differently, functionality attributed to computing device 100 may include a cluster of one or more computers, workstations, servers, or the like, in any combination. For example, a first server may host a first portion of computing device 100, while a separate server hosts another portion of computing device 100. In some examples, a cluster of one or more computers that hosts computing device 100 may also host other aspects of system 101 (e.g., such as historical databases 130, financial accounts 140, or more or less elements of system 101).

Computing device 100 may be owned or otherwise managed or used by a financial institution to determine payment details for funds transfers from unstructured sets of data. Computing device 100 may be physically or virtually included within an internal computing infrastructure of the financial institution. Alternatively, some of computing device 100 may be physically or virtually hosted by a third-party vendor and therein used by the financial institution. For example, a vendor of the financial institution may store and maintain controller 110 for the financial institution and/or may provide the functions of controller 110 as a service to the financial institution.

In some examples, to determine payment details for funds transfers, controller 110 may access a plurality of repositories and gather data from a number of devices at a number of physical and virtual locations. Controller 110 may access network 120 to communicate with and/or gather data from these other physical and virtual locations. Network 120 may include one or more private or public computing networks. For example, network 120 may comprise a private network associated with the financial institution. Alternatively, or additionally, network 120 may comprise one or more public networks, such as the Internet or a cell phone network. Using network 120, controller 110 may access or otherwise interact with one or more historical transaction information databases 130 ("historical databases 130"), one or more user financial accounts 140, one or more user devices 160, one or more third-party devices 170, or one or more external accounts 180. Historical databases 130 may include databases of historical transaction information as maintained by controller 110, financial accounts 140 and destination accounts 180 may include accounts with which people may hold or transfer money, public databases 150 may include public data repositories as hosted on the internet, and user devices 160 and third-party devices 170 may include mobile phones, laptops, or personal computers owned by or otherwise associated with a user or third party, respectively.

Although illustrated in FIG. 1 as a single entity, in other examples network 120 may comprise a combination of public and/or private networks. For example, network 120 may include one or more private networks (e.g., a network with a firewall that blocks non-authorized external access) that includes one or more of historical databases 130 and financial accounts 140. In this example, network 120 may further include one or more public networks through which entities, components, and/or systems of the private network (e.g., computing device 100) may access one or more of public databases 150, user devices 160, third-party devices 170, and/or external accounts 180. In some examples, one or more components of system 101 may be directly coupled to computing device 100 such that controller 110 may access these components without accessing network 120. For example, in other examples one or more historical databases 130 may be incorporated within computing device 100 such that controller 110 may maintain the one or more historical databases 130 without accessing network 120.

User device 160 are generally discussed herein as computing devices that are associated with a user for whom controller 110 determines payment details. Toward these lines, for purposes of clarity controller 110 and user device 160 are generally discussed herein as sending messages and/or instructions over network 120 for each other. However, it is to be understood that in some examples controller 110 may instead send messages and/or instructions over network 120 that are directed to an account associated with the user, such that the user may use any of a plurality of user devices 160 that are continuously or temporarily associated with the user to view and/or response to these messages and/or instructions. For example, controller 110 may send a message over network 120 to a virtual account associated with the user, in response to which a computer at a public library may function as user device 160 in providing the message and/or instructions to the user when the user logs in to their account. For another example, controller 110 may send a plurality of messages regarding one or more funds transfers to user that are received by and responded to by a plurality of user devices 160, such as a mobile device and a home desktop computer that are both associated with the user.

Controller 110 may maintain one or more historical databases 130 that store historical transaction information. Historical transaction information as discussed herein may include information relating to previously executed transactions. Historical transaction information may include relatively standard transactional information such as payment amounts, source accounts (e.g., a location from which the funds originated), destination accounts (e.g., a location to which the funds are transported), dates of funds transfers, or the like. As maintained by controller 110, historical databases 130 may also include contextual data of the historical transactions, such as relationships of people involved in the transactions, visual imagery of the transactions, audio data of the transactions, or events, reasons, or categorizations of the transactions. Further, controller 110 may maintain historical database 130 to be organize historical transaction information at least partially by their association with users.

For example, one historical transaction may relate to a funds transfer of $30 from user Mike Davis's checking account 012345 within a financial institution to another account of the financial institution 678910 as occurring on Feb. 22, 2018. Further, controller 110 may maintain this historical database 130 such that this historical funds transfer includes contextual information of "Monthly Happy Hour" involving other user "Bill Jones" and having imagery of license plates and large-screen televisions adorned to walls. For another example, another historical transaction may relate to a funds transfer of $40 from user Nathan Brown's savings account 445566 with the financial institution to an external account 778899 on Jan. 20, 2018, where this historical transaction had contextual data of "tailgating" involving other user "Sarah Miller" and having imagery of grills and yard games and audio of "go wildcats!" In some examples, controller 110 may have previously executed funds transfers associated with these historical transactions, and subsequently uploaded the relevant details to historical databases 130. In other examples, controller 110 may have identified these funds transfers upon execution (e.g., execution with a teller of a bank or execution using an application in which the user explicitly provides all payment details in separate entry fields) and uploaded the relevant details to historical databases 130 once such data is gathered.

As mentioned above, historical databases 130 may include historical transaction information on a plurality of users, where each user is or was a customer of the financial institution. For example, each of the plurality of users may have one or more financial accounts 130 with the financial institution in which the respective users store funds. Financial accounts 130 may relate to checking accounts, savings accounts, credit card accounts, or the like.

Controller 110 may receive data associated with a transaction. The data may be substantially unstructured and unsorted, such that the data may be received with a minimum of metadata (e.g., only the metadata that a device attaches by default when the data is created). The data may include video data, audio data, photographic data, or the like. Controller 110 may receive the data directly from user device 160 over network 120. The data may include a recording, picture, or video just created or received from user device 160. For example, the data may include some version of a multimedia file created in a social media program. The data may be received by controller 110 in a substantially unedited and "untagged" format. For example, continuing the example offered above, controller 110 may receive data that includes a video made on a social media program by user Mike Davis, where the content of the video includes footage within a neighborhood bar, the footage including another user Bill Jones.

In some examples, controller 110 may detect the creation or existence of the data on user device 160, and may therein gather the data in response to such detection. For example, using the Mike Davis example above, app instance 162 that corresponds to controller 110 (e.g., where app instance 162 functions as a computing agent of controller 110 that communicates over network 120 with controller 110) may identify Mike Davis creating the video at the neighborhood bar using user device 160 and may identify the data as relating to a transaction, and may therein send this data to controller 110. In other examples, controller 110 may receive data as a result of a user affirmatively sending the data to controller 110. For example, a user may open app instance 162 on user device 160 and may select the data as stored on user device 160 for submission across network 120 to controller 110. To apply the tailgating example with user Nathan Brown from above, Nathan Brown may receive a set of pictures of the tailgating over network 120 from a third-party device 170 owned by Sarah Miller, and user Nathan Brown may select a button on user device 160 that sends the pictures to controller 110.

Upon receiving data, controller 110 may identify a user that is associated with the data. For example, controller 110 may identify the user as a result of the data coming from user device 160, where controller 110 may detect the network address of user device 160 and correlate this address with the user. Alternatively, where the data is sent to controller 110 using app instance 162, app instance 162 may be registered to the user and may tag the message or data with the identity of the user when sending the data to controller 110. Alternatively or additionally, controller 110 may be configured to analyze the data to identify the user. For example, controller 110 may use facial recognition techniques to identify the face of the user, or controller 110 may use voice recognition techniques to identify the voice of the user, or controller 110 may use spatial recognition techniques to identify an environment associated with the user (e.g., a domicile of the user or a particular booth at an eatery that is regularly frequented by the user) in order to identify the user. In this way, a third party (e.g., a person to whom money is owed) may submit the data from third-party device 170, in response to which controller 110 may identify the user (e.g., the person, associated with user device 160, whose account will serve as the source of funds), and may therein determine and provide payment details to the user (e.g., provide over network 120 to user device 160) for approval and execution as described herein.

Controller 110 may analyze the data to identify contextual information of the data. For example, controller 110 may execute facial recognition techniques, voice recognition techniques, spatial recognition techniques, optical character recognition techniques, natural language processing (NLP) techniques, and the like to identify contextual information. Using such techniques, controller 110 may identify contextual information such as people that were viewed and/or heard in the data, an environment or setting of the data, payment amounts (e.g., "think you could send me 30 bucks for this?") or general payment obligations (e.g., "can you transfer me your share later?"), depicted amounts of fees (e.g., an image of a bill or a receipt), or the like.

In some examples, controller 110 may detect an element such as a phrase or an object or a face which controller 110 is not able to identify. In such examples, controller 110 may reference public database 150 to identify or quantify such element. For example, controller 110 may identify a face which controller 110 is unable to map or associate to a person or user of historical database 130, in response to which controller 110 may access one or more social media application public databases 150 that include many pictures of people. Upon accessing the social media public databases 150, controller 110 may compare the unassociated face against the pictures of the social media applications to attempt to identify the person of the unassociated face. Once identified, controller 110 may attempt to cross-correlate the identified person with users of historical database 130 and/or an internal financial account 140 that the identified person owns with the financial institution. For another example, public database 150 may include dictionaries that include slang or colloquial phrases against which controller 110 may compare the element where the element was an unidentified phrase.

Controller 110 may use contextual information of the data along with historical transaction information from historical databases 130 to determine payment details associated with the transaction of the data. For example, to continue the happy hour example above, controller 110 may identify the contextual information of the scenery of the neighborhood bar (e.g., license plates and big-screen TVs on the walls, pitchers of beer, or the like) the presence of Bill Jones, and the audio of Bill Jones saying, "another successful happy hour! I just grabbed the tab. Just send me $25 when you think of it." Controller 110 may then access historical databases 130 for records relating to user Mike Davis and identify that Mike Davis has sent monthly payments of varying amounts from account 012345 to account 678910, where such payments are associated with Bill Jones and imagery of the neighborhood bar that are substantially similar to the images of the current set of data. In response to determining this, controller 110 may create a funds transfer of $25 (e.g., as gathered from the data) from account 012345 (e.g., as gathered from historical database 130) to account 678910 (e.g., as gathered from historical database 130). Controller 110 may present this funds transfer over network 120 to user device 160 associated with the user (Mike Davis), and, once controller 110 receives approval from network 120 as sent by user device 160 (e.g., as provided by user Mike Davis on app instance 162), controller 110 may execute the funds transfer. Upon executing the funds transfer, controller 110 may upload details of the funds transfer (e.g., such as the payment details and some or all of the contextual information) to historical databases 130.

For another example, to continue the tailgating Nathan Brown example above, controller 110 may receive data associated with the tailgating along with a request to execute the associated funds transfer. Once received, controller 110 may identify the contextual information of the scenery of tailgating (e.g., grills, people throwing footballs, coolers, lawn chairs, and the like), the presence of Sarah Miller, and a caption of, "I think we better head to our seats; can you transfer me your share later?" Having identified the data as being associated with user Nathan Brown, controller 110 may access historical databases 130 for records relating to Nathan Brown and identify that Nathan Brown has sent near-weekly payments of exactly $40 from account 445566 to account 778899, where such payments are associated with Sarah Miller and imagery of tailgating that are substantially similar to the images of the current set of data. In response to determining this, controller 110 may create a funds transfer of $40 (e.g., as gathered from historical database 130) from account 445566 (e.g., as gathered from historical database 130) to 778899 (e.g., as gathered from historical database 130). In some examples, controller 110 may have received or otherwise identified preemptive authorization (e.g., as sent by user device 160 as inputted by the user, or as saved as a preemptive authorization flag in a record accessible to controller 110 and as previously selected by the user) to execute funds transfers related to Sarah Miller, in response to which controller 110 may autonomously and immediately execute the funds transfer upon determination of the payment details. Upon executing the funds transfer, controller 110 may upload details of the funds transfer (e.g., such as the payment details and some or all of the contextual information) to historical databases 130.

In some examples, controller 110 may receive corrections to the funds transfer details upon preliminarily presenting funds transfer details to computing user device 160 associated with the user. For example, continuing the happy hour example above, in response to determining that Bill Jones stated the monetary amount "25 bucks," controller 110 may determine payment details that include a preliminary payment amount of $25. However, when presented to user device 160 over network 120, user may use app instance 162 to correct the payment amount to $30. When receiving this correction, controller 110 may update the payment amount $30 and execute the funds transfer with this corrected payment amount.

Similarly, in some examples controller 110 may receive corrections to contextual information from user device 160 as inputted by the user. For example, continuing the happy hour example above, at a subsequent date of Mar. 1, 2018, controller 110 may receive data from which controller 110 identify contextual information including the presence of Bill Jones and Bill Jones saying, "I figure 35 bucks should do it," and visual imagery that includes a sign that reads "Frank's Diner". Controller 110 may compare this sign to public database 150 and determine that the data related to dinner at a restaurant focused on casual dining. In this example, controller 110 might not be able to identify previous historical transactions relating to dinners with Bill Jones, and may thus present a partially completed funds transfer to user device 160 associated with the user which does not include a target account and notes a context as "dinner." The user may use app instance 162 to update the context to "happy hour" and correct a payment amount to $40. Controller 110 may, in response to updates detected by app instance 162, determine that an appropriate destination account for Bill Jones is 678910, and that the payment amount should be adjusted to $40. When receiving this correction, controller 110 may update the payment amount to $40 and execute the funds transfer with this corrected payment amount.

Controller 110 may use historical databases 130 to improve at determining payment details and/or contextual information over time. Specifically, controller 110 may identify preferences or trends of users and/or improve at identifying contextual data by, e.g., updating thresholds of categorizations and/or learning to make new associations. For example, continuing the happy hour example from above, controller 110 may determine that user Mike Davis always adds $5 to the payment amount identified from contextual data relating to happy hours, in response to which controller 110 may add $5 to funds transfers provided to user Mike Davis (e.g., along with the original payment amount from the contextual data). In some examples, controller 110 may affirmatively indicate any such preemptive correction as provided to user device 160 that is associated with the user (e.g., provided using app instance 162) to give the user a means to ratify or refuse the current and/or future use of such preemptive correction.

For another example that continues the happy hour example from above, controller 110 may identify that the contextual event "happy hour" may apply to data that includes other scenery besides the previous happy hour locations. In response to this identification, controller 110 may broaden a threshold with which controller 110 associates new sets of data with category "happy hour" as stored in historical databases 130. For example, controller 110 may identify contextual information of data of user Mike Davis as relating to happy hours whenever Joe Smith is involved and the two are at an eatery or bar, or whenever the data associated with Mike Davis as received on a Thursday, or the like.

Further, in some examples controller 110 may update a technique of categorizing contextual data associated with one user based on corrections received from other users. Controller 110 may update a technique of categorizing or identifying contextual data in response to a threshold number of users providing similar corrections to contextual data. For example, in response to controller 110 receiving nine other corrections from other users that indicate that a contextual setting of "happy hour" is to be applied to settings other than previous settings, controller 110 may broaden a definition of "happy hour" to be an event that can be held at a plurality of relatively different settings.

Figure 2:
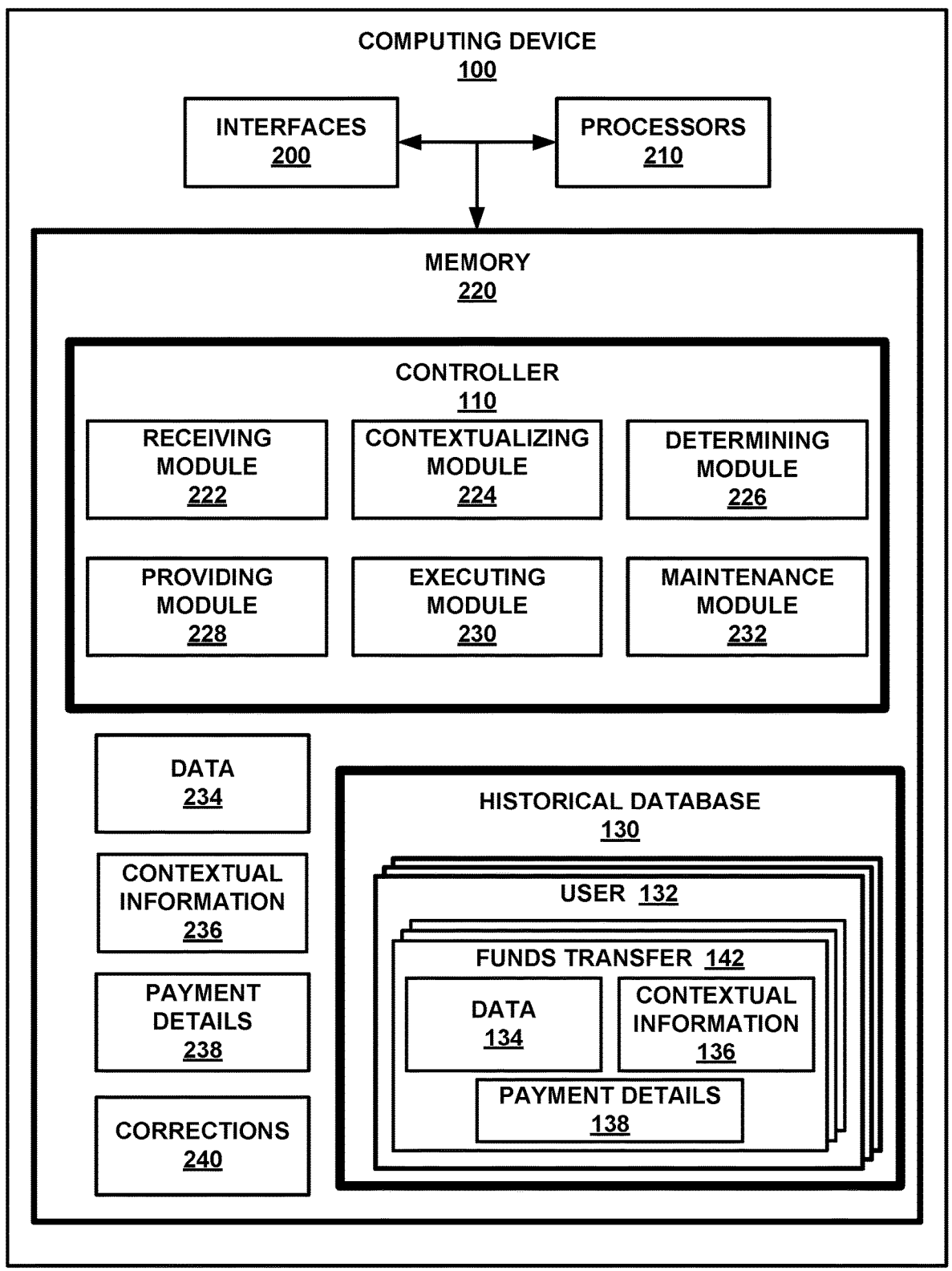
FIG. 2 is a block diagram illustrating the computing device of FIG. 1 in greater detail, in accordance with the techniques of this disclosure.

FIG. 2 is a block diagram illustrating logic modules of computing device 100 of FIG. 1. Computing device 100 includes interfaces 200, processors 210, and memory 220. Computing device 100 may include any number of interfaces 200, processors 210, and memory 220 components. Interfaces 200 may enable controller 110 to communicate with one or more databases (e.g., historical databases 130 or public databases 150 or the like), computing devices (e.g., user device 160 or third-party device 170), and/or one or more networks 120. Though historical database 130 is depicted in FIG. 1 as a separate component accessed over network, in some examples historical database 130 (or other components or databases) are directly coupled to or incorporated within computing device 100 and accessed using interfaces 200. In some examples, interfaces 200 and/or controller 110 may include a service data objects framework to ensure that logic modules within computer device 100 are accessed in a uniform way and also themselves access external modules/data/components in a uniform way. Interfaces 200 may include one or more network interface cards, such as Ethernet cards, and/or any other types of interface devices that can send and receive information. Any suitable number of interfaces 200 may be used to perform the described functions according to particular needs.

Computing device 100 may include one or more processors 210 configured to implement functionality and/or process instructions, such as instructions for determining payment details for funds transfers from unstructured sets of data. For example, processors 210 may be configured to execute instructions of controller 110 as stored in memory 220. Processors 210 may include, for example, microprocessors, digital signal processors (DSPs), application specific integrated circuits (ASICs), field-programmable gate arrays (FPGAs), and/or equivalent discrete or integrated logic circuitry.

Computing device 100 may include memory 220 which may be configured to store information within computing device 100. Memory 220 may include a computer-readable storage medium or computer-readable storage device. In some examples, memory 220 may include one or more of a short-term memory or a long-term memory. Memory 220 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, memory 220 may store logic (e.g., logic of controller 110) for execution by one or more processors 210. In further examples, memory 220 may be used by controller 110 to temporarily store information during program execution. For example, controller 110 may store data 234 (e.g., data that is associated with a transaction), contextual information 236, payment details 238, or corrections 240. In other examples controller 110 may store more or less data in memory 220, or may store the same data in a different structure or organization.

Controller 110 may include instructions executed by one or more processors 210 of computing device 100 to perform the functions of controller 110 as described herein. For example, as described herein, controller 110 may be configured to identify a user that is associated with an incoming set of data that is associated with a transaction and, using contextual information of the data and/or a historical transaction information, execute a funds transfer for the transaction. Controller 110 may include receiving module 222, contextualizing module 224, determining module 226, providing module 228, executing module 230, and maintenance module 232. The specific division of logic within controller 110 is depicted in FIG. 2 and discussed herein for purposes of illustration only, as in other examples controller 110 may include more or less modules that are configured to execute different portions or aspects of the logic described herein.

Receiving module 222 of controller 110 is configured to receive data 234 associated with a transaction. Once received, receiving module 222 may store data 234 in memory 220. Receiving module 222 may receive data 234 through interface 200 as sent over network 120. For example, receiving module 222 may receive data 234 from user device 160 or third-party device 170 as described above. In some examples, the user may actively send data 234 (e.g., using app instance 162). In other examples, receiving module 222 may detect the creation or storage of data 234 at a location that is accessible to receiving module 222 (e.g., the creation of data 234 on user device 160), in response to which receiving module 222 may request or otherwise gather data 234.

In certain examples, receiving module 222 may receive many sets of data 234, only to discard (e.g., delete without saving) those sets of data 234 that are determined to not be associated with a transaction. In such examples, app instance 162 may be configured to send sets of data 234 to receiving module 222 without first determining whether the sets of data 234 are associated with a transaction. For example, app instance 162 may be configured to send all videos, pictures, recordings, and the like that are sent or received via social media applications to receiving module 222. Alternatively, app instance 162 may be configured to send videos, pictures, records, and the like that are sent or received via social media applications that satisfy certain predetermined characteristics (e.g., being sent to or from certain people known to be associated with funds transfers such as Bill Jones or Sarah Miller as described above) to receiving module 222. If controller 110 is unable to determine payment details for the received data as described herein (e.g., as a result of not being able to identify a transaction or user that is associated with the received data, or as a result of not being able to identify contextual information and/or historical transaction information that relates to the received data), receiving module 222 may discard the data. In some examples, receiving module 222 may further provide an error to user device 160 associated with the user and/or to the device from which the data was received (where data was sent from third-party device 170).

Receiving module 222 may receive data 234 that is in a substantially unstructured state. Put differently, receiving module 222 may receive data 234 that contains and/or is associated with a minimum of metadata, such as the data requires substantially only the source metadata automatically attached to the data at the point of creation (e.g., a file type, a date and time of creation, a set of global positioning system coordinates, a duration, or the like). As received, data 234 may include a video, photograph, recording, or the like.

Receiving module 222 may identify a user that is associated with data 234. In some examples, a message or data packet that includes data 234 may identify the user, such as in a header of the data packet. Alternatively, receiving module 222 may identify a user by referencing a source IP address of the data packet that includes data 234 with an "address book" of IP addresses stored in memory 220 or otherwise accessible to receiving module 222, where the address book correlates the source IP address of the data packet with the user. Where receiving module 222 is unable to identify the user associated with data 234, receiving module 222 may cause contextualizing module 224 to execute recognition techniques as described herein to identify the user. Other techniques of identifying the user that are consistent with this disclosure are also possible.

Once receiving module 222 has received data 234, receiving module 222 may cause contextualizing module 224 to identify contextual information 236 of data 234. Contextual information 236 may include people depicted in data 234, voices heard in data 234, viewable text within data 234, non-human imagery of data 234, or the like. As depicted in FIG. 2, contextual module 224 may store identified contextual information 236 of data 234 within memory 220. Contextual module 224 may analyze data 234 with a plurality of recognition techniques to identify contextual information 236. For example, contextual module 224 may execute facial recognition techniques, voice recognition techniques, optical character recognition (OCR) techniques, spatial imagery recognition techniques, NLP techniques, or the like to identify contextual information 236.

In some examples, contextual module 224 may use network 120 to access public databases 150 to identify some aspects of data 234. For example, contextual module 224 may isolate a visual image or a written or audible word that the contextual module 224 is unable to categorize, such as a face of an unknown person or a written or spoken slang phrase. Contextual module 224 may search various public databases 150 to identify a person or a meaning or the like that matches the isolated element. Contextual module 224 may determine that an isolated element is identified when contextual module 224 identifies an entity within public databases 150 that is sufficiently similar to the isolated element.

Contextual module 224 may cause determining module 226 to determine payment details once conceptual module 224 identifies contextual information of data 234. Determining module 226 may determine payment details about the transaction of data 234. Determining module 226 may determine payment details based on contextual information 236 and historical transaction information of historical database 130.

Payment details as determined by determining module 226 may include a payment amount, one or more recipients, a source financial account related to the user, and one or more destination accounts related to the one or more recipients. Determining module 226 may identify records of historical database 130 that correspond to contextual information 236 of data 234 as identified by contextualizing module 224. Determining module 226 may reference contextual information 236 of data 234 as stored in memory 220 by contextualizing module 224.

Determining module 226 may reference historical database 130 to locate a set of records that relate to each of the users associated with data 234. For example, historical database 130 may contain records on a plurality of users 132, where records of users 132 may include records of a plurality of funds transfers 142, and each funds transfer 136 record included the respective data 134 (e.g., the original video, photograph, recording or the like as previously received by controller 110 that contains a minimum of metadata), contextual information 136, and/or payment details 138. This depicted organizational structure of data is provided purely for purposes of illustration, as historical databases 130 of historical transaction information may be stored in other ways in other examples. For example, in some situations historical database 130 might not store the initial data 134 for each respective historical funds transfer 136.

Determining module 226 may locate a series of funds transfers 142 that relate to the user associated with data 234. Once determining module 226 locates these funds transfers 142, determining module 226 may identify one or more funds transfers 142 that correlate with the received data 234. Determining module 226 may determine that one or more historical funds transfers 142 correlate with the received data 234 as a result of the one or more historical funds transfers 142 having contextual data 136 that is similar to contextual data 236 of received data 234. For example, determining module 226 may compare people, settings, dates, events types, or the like as identified by contextualizing module 224 to people, settings, dates, events types, or the like stored in contextual information 136. If determining module 226 determines that historical contextual information 136 has at least a threshold number of substantial similar elements to contextual information 236 as identified by contextualizing module 224, determining module 226 may determine that the identified funds transfers correlates to data 234.

Alternatively, determining module 226 may directly compare stored data 134 of one or more historical funds transfers 142 to the received data 234. Determining module 226 may directly compare stored data 134 to the received data 234 in response to none of the historical contextual information 136 matching the identified contextual information 236. Put differently, determining module 226 may only directly compare historical data 134 to received data 234 when the historical contextual information 136 does not have a sufficiently strong match to the currently identified contextual information 236 to determine all necessary payment details. In some examples, determining module 226 may cause contextualizing module 224 to compare received data 234 and historical data 134. Determining module 226 (and/or contextualizing module 224, depending upon which is doing the comparison) may determine that one or more sets of historical data 134 may match received data 234 in a way that was not recorded in historical and/or identified contextual information 136, 236. For example, historical data 134 may include relatively unique imagery, scenery, ambient noise, or the like that is substantially similar to imagery/ scenery/ambient noise of received data 234.

Once determining module 226 identifies one or more historical funds transfers 142, determining module 226 may determine payment details 238 for the transaction of received data 234. As discussed herein, determining module 226 may determine payment details 238 to include a source account of the user (e.g., one of financial accounts 140), a destination account for funds to transfer to (e.g., one of external accounts 180 and/or financial accounts 140), a payment amount, or the like. Determining module 226 may initially determine payment details 238 from identified contextualizing information 236, and then determine any remaining payment details 238 from historical payment details 138 of historical funds transfers 142 that determining module 226 has determined to correlate to the received data 234 as described herein.

For example, determining module 226 may identify that data 234 associated with a user includes contextual information 236 as identified by contextualizing module 224 that includes a payment amount of $15 to two different recipients as related to "Friday Business Lunch." Determining module 226 may further determine that the contextual information 236 does not include specific destination accounts for the two recipients. Accordingly, determining module 226 may identify two historical funds transfers 142 that both relate to user 132 of data 234 that each include contextual information 136 of "Friday Business Lunch" and each include contextual information 136 that related to one of the two different recipients of the contextual information 236. Determining module 226 may thus identify a first destination account for the first recipient from payment details 138 of the respective funds transfer 142 related to the first recipient, and identify a second destination account for the second recipient from the respective payment details 138 of the respective funds transfer 142 that relates to the second recipient.

Determining module 226 may cause providing module 228 to provide payment details 238. Payment details may directly provide payment details 238 to user device 160 associated with the user that is associated with data 234, even if the user associated with data 234 did not originally send data 234 (e.g., where third-party device 170 sent data 234). Providing module 228 may provide payment details 238 to user device 160 (e.g., on app instance 162) over network 120 using interfaces 200. In some examples, providing module 228 may provide some contextual information 236 to user device 160 associated with the user along with payment details 238.

Providing module 228 may provide payment details 238 to user device 160 along with instructions for user device 160 to provide the user with an option or prompt to edit payment details 238 and/or contextual information 236. For example, providing module 228 may instruct user device 160 to provide an "edit" button that a user may use to add, delete, modify, or otherwise provide corrections 240 to payment details 238 and/or contextual information 236. Providing module 228 may save these corrections 240 as sent from user device 160 over network in memory 220. Providing module 228 may update payment details 238 and/or contextual information 236 per these corrections, or providing module 228 may cause determining module 226 and/or contextualizing module 224 to update payment details 238 and/or contextual information 236, respectively.

Providing module 228 may receive a request, from computing user device 160 operated by the user, to execute one or more funds transfers according to payment details 238. In some examples, a user may initially provide one or more corrections 240 over network 120 using user device 160 to preliminary payment details 238 and/or preliminary contextual information 236, in response to which providing module 228 may provide updated payment details 238 and/or contextual information 236 to user device 160 and then receive a request to execute a funds transfer according to the correct payment details 238. Providing module 228 may cause executing module 230 to execute the one or more funds transfers. For example, executing module 230 may transfer some funds from a source account of the user as stored at the financial institution to one or more destination accounts associated with the one or more recipients. Once executing module 230 executes the funds transfer, executing module 230 may store details of the funds transfer in historical database 130 as associated with the user. For example, executing module 230 may store the executed funds transfer as a historical funds transfer, in which the received data 234 is historical data 134, the identified contextual information 236 is historical contextual information 136, and the determined payment details 238 are historical payment details 138. In some examples, executing module 230 may store corrections 240 in historical dataset 130 for future reference as, for example, additional contextual information 136.

Throughout the process of automating funds transfers in response to receiving unstructured data, maintenance module 232 may maintain historical database 130. Maintenance module 232 may update historical funds transfers 142 over time to improve the process of determining payment details for funds transfers in response to receiving unstructured data. Maintenance module 232 may update contextual information 136 of one or more funds transfers 142 in response to receive corrections 240. In some examples, maintenance module 232 may add new contextual information 136 to a historical funds transfer 142 where a comparison of the respective historical data 134 and newly received data 234 revealed a new aspect of contextual information (e.g., such as in the example above where controller 110 identified ambient noise or surrounding scenery or imagery as being similar). Similarly, in some examples maintenance module 232 may update contextual information 136 of historical funds transfers 142 of one user 132 based on respective corrections 240 received from or regarding other users 132. For example, if maintenance module 232 receives corrections 240 from a threshold number or percentage of users 132 regarding a slang phrase or the meaning of a specific piece of contextual information 136, maintenance module 232 may update the slang phrase or meaning across all funds transfer 142 for all users 132 that include that contextual information 136, regardless as to whether or not the respective users 132 of each individual funds transfer 142 had provided such correction(s) 240. In this way, maintenance module 232 may improve an ability of controller 110 determining and executing a funds transfer by contextualizing and analyzing received unstructured sets of data related to a transaction.

Figure 3:
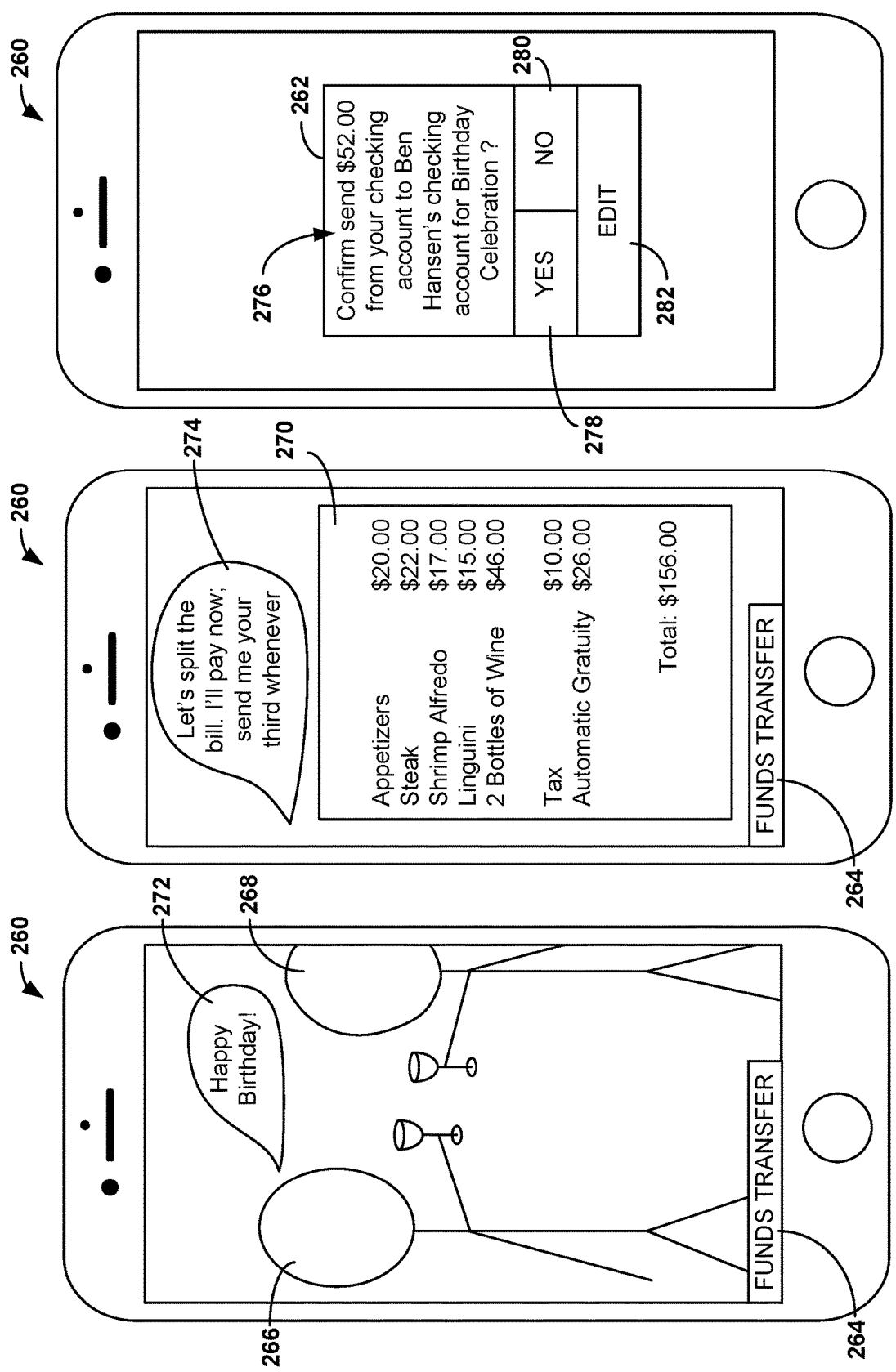
FIGS. 3A, 3B, and 3C are conceptual and schematic diagrams illustrating a user device capturing data of two people, capturing data of a receipt, and providing determined payment details, respectively and in accordance with the techniques of this disclosure.

FIGS. 3A-3C are conceptual and schematic diagrams illustrating an example mobile phone user device 260 as capturing data of first person 266 and second person 268, capturing data of receipt 270, and of app instance 262 displaying determined payment details and contextual information on user device 260, respectively. Specifically, as depicted in FIGS. 3A and 3B, user device 260 may capture a set of data that includes first person 266 saying first phrase 272 of "happy birthday" to second person 268, and then an image of receipt 270 that totals to $156.00 along with second phrase 274 of, "let's split the bill. I'll pay now; send me your third whenever." As depicted, controller 110 and/or app instance may provide prompt 264 to send the data to controller 110 for funds transfer automation. This prompt 264 may be available upon viewing data or upon creating the data. In other examples, a user may open app instance 262 to send the data to controller 110, or controller 110 may autonomously detect and therein request or otherwise gather this data once the data is created.

Once controller 110 receives the data, controller 110 may identify contextual information associated with the data. For example, controller 110 may identify first person 266, second person 268, first phrase 272, second phrase 274, and receipt 270 as contextual information. Controller 110 may identify first person 266 as Ben Hansen, and controller 110 may identify both first phrase 272 and second phrase 274 as attributed to first person 266 Ben Hansen. By using NLP techniques, controller 110 may determine that the user is to give (or transfer to) Ben Hansen a third of the total of $156.00 (i.e., $52.00). From this, controller 110 may identify one or more historical funds transfers 142 that involved the user transferring money from a checking account of the user to a checking account of Ben Hansen. In response to this, as depicted in FIG. 3C, controller 110 may provide message 276 to user device 260 (and therein the user on app instance 262) that includes both payment details and contextual information. Further, as depicted in FIG. 3C, controller 110 may instruct user device 160 to simultaneously and/or sequentially provide approval prompt 278 (with which the user may request that controller 110 execute the funds transfer according to message 276), denial prompt 280 (with which the user may request that controller 110 does not execute the funds transfer), and/or edit prompt 282 (with which the user may provide corrections as described herein to payment details and/or contextual information) to the user.

Figure 4:
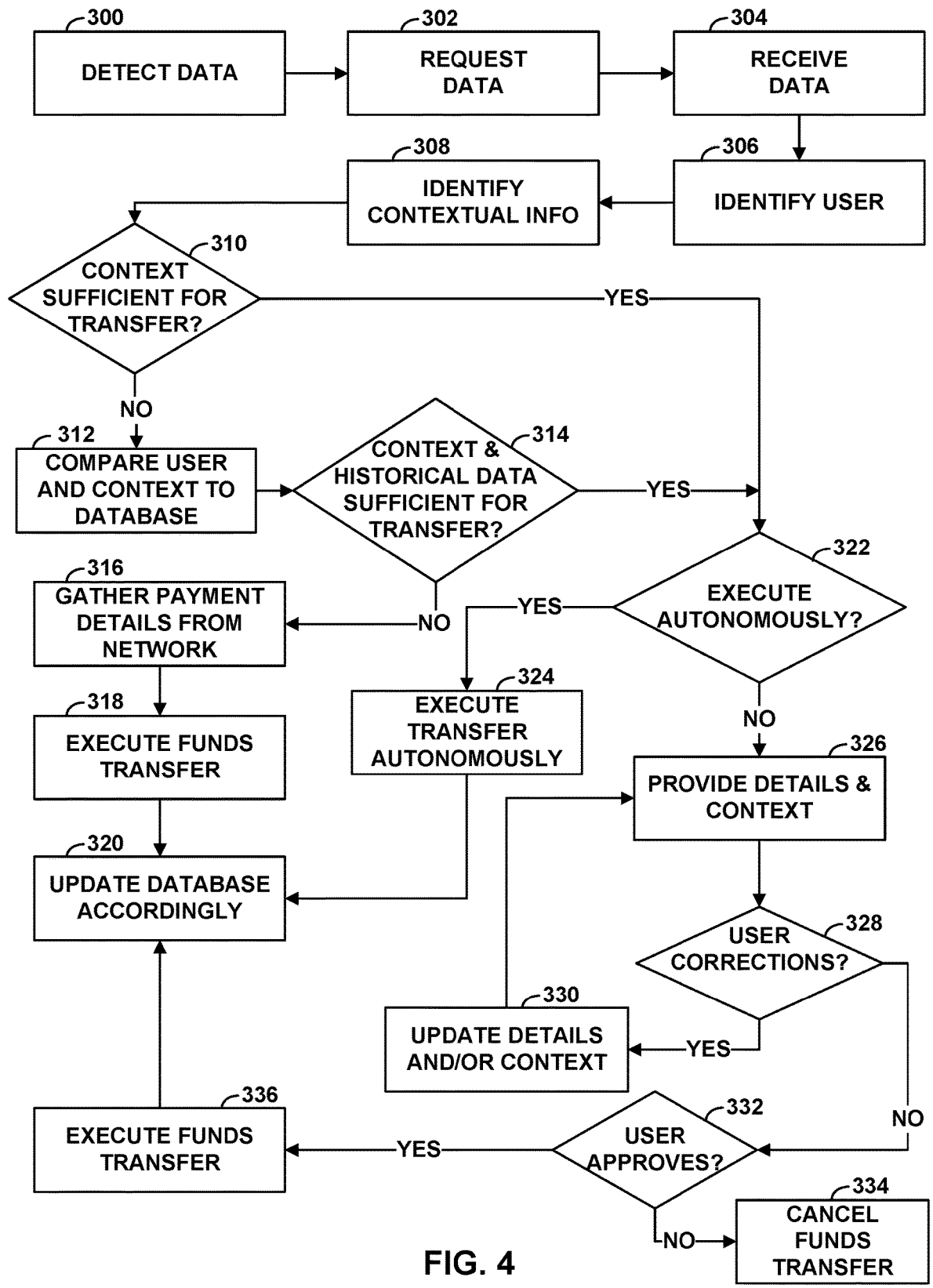
FIG. 4 is a flowchart illustrating an example method of determining payment details for funds transfers from unstructured sets of data, in accordance with the techniques of this disclosure.

FIG. 4 is a flowchart illustrating an example method of determining funds transfer payment details from unstructured data. The example method is described with respect to the components of FIG. 1, such that the payment details of the funds transfer are determined by controller 110 of computing device 100. However, it is to be understood that the steps of the flowchart of FIG. 4 may be executed by other devices in other examples.

Controller 110 may detect a set of data (300). The action may involve or be associated with one or more users of one or more products (e.g., products including a savings account, a checking account, a credit card, or the like) of a financial institution. Controller 110 may detect information, over network 120, about the data being created and/or the data being received by one or more devices on network 12. For example, controller 110 may detect, over network 120, information about data being received by user device 160 as sent by third-party device 170. Controller 110 may request the data (302). For example, controller 110 may request the data over network 120 by outputting a signal over network 120. One or more of user device 160, third-party device 170, or another device may detect a signal over network 120, determine that the signal corresponds to a request for data, and respond to the signal by sending the data over network 120 to device 100 (and thereby controller 110).

Controller 110 may receive the data (304). Controller 110 may determine that the data substantially consists of a video, a photograph, a recording, or the like. Controller 110 may receive the data with a minimum of metadata associated with the data. For example, controller 110 may receive the data with the only data being GPS coordinates of the creation of the data, a date and time at which the data was created, a device associated with the creation of the data, or the like. The data may be associated with a transaction. Put differently, the data may be associated with an obligation of a user to execute a transaction.

Controller 110 may identify this user (306). In some examples, controller 110 may identify this user by a header of the packet that contained the data, where the header includes information that indicates the user. In other examples, a user may log into a secure portal in order to upload data, and establish a session. In such an example, session data may affirmatively indicate the user to controller 110 when controller 110 receives data pursuant to the session. In yet other examples, controller 110 may identify a source address of data when controller 110 receives data such as an IP address, and controller 110 may reference an "address book" of sorts that identifies the user as associated with the address.

Controller 110 may identify contextual information of the data (308). Controller 110 may identify contextual information by utilizing various face recognition techniques, voice recognition techniques, NLP techniques, OCR techniques, or the like on the data. Controller 110 may reference one or more public databases 150 as available over network 120 to identify or categorize some aspects of contextual data. For example, controller 110 may identify an object of the data as a face, but controller 110 might not be able to identify the person whose face has been identified. In this example, controller 110 may utilize social media public databases 150 to compare the identified face to pictures of people, to identify the person behind the identified face. For another example, controller 110 may identify a distinct noise that controller 110 is unable to categorize, in response to which controller 110 may compare the distinct noise against noises from a plurality of sound databanks available online.

Controller 110 may determine whether the identified contextual information alone is sufficient to execute a funds transfer (310). For example, the data may include the spoken phrases: "great idea again on us going to the game; want to just transfer me $30 for your share of the tickets using the new funds transfer program that lets you send funds to friends or family by listing their email address or phone number? My account is associated with my email address, Benjamin.Watson@gmail.com," and, "sure! I also use that new funds transfer program, I will transfer that over right now." From this, controller 110 may determine a payment amount ($30), a source account (the users account in the funds transfer program), a destination account (Benjamin Watson's account in the funds transfer program as associated with his email address), and sufficient context (an outing at a game with Benjamin Watson) to execute the funds transfer. In response to determining that the contextual information alone had sufficient information, controller 110 may determine whether the funds transfer can be determined autonomously (322) as discussed in more detail below. However, it may be relatively rare for contextual information alone to be sufficient to execute a funds transfer. Specifically, it may be unlikely for the data to include sufficient information for controller 110 to discern a source account for funds to come from as well as a destination account to which funds are transferred.

Where the contextual information alone was insufficient to determine payment details, controller 110 may attempt to identify payment details using historical transaction information of historical database 130. Specifically, controller 110 may compare the user and the identified contextual information against records of historical transaction information of historical database 130 (312). Controller 110 may compare the user and the identified contextual information to identify a subset of historical funds transfers of the user as stored in historical database 130 from which controller 110 may determine payment details. For example, if controller 110 can determine the user associated with the data, the payment amount, and a general context of the data as described herein, but is not able to identify the source account and/or the destination account from the data, controller 110 may identify an appropriate source account and/or destination account from historical database 130.

Controller 110 may determine if enough information can be gathered from historical database 130 and contextual information to determine payment details (314). Where controller 110 determines payment details from contextual information and historical transaction information from historical database 130, controller 110 may determine whether to execute the funds transfer autonomously as at step 322 as described below. In other examples, controller 110 may determine that sufficient payment details (e.g., enough payment details to execute a funds transfer). For example, controller 110 might not be able to identify a destination account for the payment details.

In such examples, controller 110 may gather the payment details directly from the user (316). Specifically, controller 110 may send a request, to user device 160 operated by the user, for the payment details. For example, controller 110 may output information over network 120 that user device 160 interprets as a command to present a message that includes the determined payment details and the contextual information and a request to correct and/or provide missing aspects of the payment details and/or contextual information. The message sent by controller 110 over network 120 to user device 160 associated with the user may further instruct user device 160 to inform the user that controller 110 will execute a funds transfer in response to the user providing the payment details and approving the funds transfer. In response to sending this message, controller 110 may receive corrections over network (as sent from user device 160 by the user using app instance 162) regarding payment details that include a destination account for a recipient. Further, controller 110 may receive corrections regarding contextual data that modify the environment of the data from a "birthday celebration" to a "happy hour" (e.g., if the people were singing happy birthday during a regular happy hour). Accordingly, once controller 110 receives the missing payment details from computing device 160 (e.g., acquired through user input detected by user device 160), controller 110 may execute the funds transfer according to the payment details (318). Once executed, controller 110 may update historical database 130 of historical transaction information as described in more detail herein (320).

As described above, in response to controller 110 determining the payment details (using contextual information and/or contextual information and historical data), controller 110 may determine whether to autonomously execute the funds transfer (322). Controller 110 may determine to autonomously execute the funds transfer in response to contextual information indicating at least a threshold confidence score regarding the payment details. For example, where controller 110 determines the user herself discussed the funds transfer and the funds transfer has a threshold similarity with a threshold number of funds transfers of historical database 130, controller 110 may determine that the current data indicates a high enough confidence score for a respective funds transfer to be executed autonomously. Alternatively, or additionally, controller 110 may identify a request for autonomous funds transfer from user that is external to data. For example, controller 110 may detect that a message that includes the data may also include a request from the user to autonomously transfer funds determined using the data. Controller 110 may detect the request within a header of the message. Alternatively, or additionally, controller 110 may detect a flag or the like within historical database 130 that indicates that one or more types of funds transfers associated with the user are to be executed autonomously.

In response to determining that the funds transfer is to be executed autonomously, controller 110 may execute the funds transfer autonomously (324). Executing the funds transfer autonomously may include executing the funds transfer without sending a request to or receiving a confirmation to execute from the user between determining the payment details and executing the funds transfer. Once executed, controller 110 may update historical database 130 with details of the funds transfer as described herein (320).

In other examples, controller 110 may determine that the funds transfer is not to be executed autonomously. Controller 110 may determine that the funds transfer is not to be executed autonomously in response confidence score as discussed above being below a threshold level. In certain examples, funds transfers are never executed autonomously, such that controller 110 may functionally skip step 322 (and therein step 324), in response to determining that the contextual information includes payment details (at 310) and determining that contextual information and historical transaction information from historical database includes payment details (at 314).

Controller 110 may provide payment details to the user (326). In other words, controller 110 may provide the payment details to user device 160 operated by the user over network 120. For example, controller 110 may cause computing device 100 to output a signal over network 120 that is directed toward user device 160 and/or an account that is associated with the user as described herein. App instance 162 may detect a signal over 120 and determine that the signal includes information for presentation in a user interface. App instance 162 presents the information, thereby providing the payment details to the user through a user interface presented by app instance 162 executing user device 160. Controller 110 may provide the payment details to user device 160 operated by the user along with some contextual data. In some examples, as depicted in FIG. 3C, controller 110 may instruct user device 160 to provide the payment details to the user in a single natural language message. In other examples, controller 110 may instruct user device 160 to provide a simple list of payment details and/or contextual information for the user to review (e.g., in a bullet-point format).

In some examples, the user may have corrections for the data (328). App instance 162 may detect input that corresponds to user corrections to payment details and/or contextual information. Controller 110 may receive, over network 120 from user device 160/app instance 162, information about the corrections. Controller 110 may, in response to receiving such information, update the payment details and/or contextual data (330). Controller 110 may then provide the updated payment details and/or contextual information to user device 160 for user device 160 to provide to the user (328), in response to which the user may again evaluate for corrections (328).

If the user has no corrections, the user may approve or disapprove the funds transfer according to the payment details (332). If the user disapproves the funds transfer, controller 110 may receive, from user device 160 over network 120, an indication of cancelation, and then may cancel the funds transfer (334). In response to canceling the funds transfer, controller 110 may delete the determined payment details and/or the identified contextual information. In other examples, controller 110 may save some or all of the determined payment details and/or identified contextual information in historical database 130. In certain examples, controller 110 may save payment details and/or contextual information in historical database 130 when the user provides a correction to one or both of payment details or contextual information. Controller 110 may save payment details and/or contextual information in a manner that indicates within historical database 130 that a funds transfer related to payment details and/or contextual information was not executed. In some examples, controller 110 may put less weight on historical transaction information of historical database 130 that relates to funds transfers that were not executed.

If the user does approve of the funds transfer, controller 110 may execute the funds transfer (336). For example, the user may provide an approval message using app interface 162, in response to which user device 160 may send the approval message to controller 110. Controller 110 may execute the funds transfer according to the payment details in response to receiving the approval message from user device 160. Controller 110 may update historical database 130 accordingly (320). Updating historical database 130 may include uploading payment details and contextual data of the funds transfer to a series of records that relate to the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Techniques of this disclosure may provide one or more technical advantages. For example, certain techniques of this disclosure may, in some instances, provide a technical solution to determining payment details from unstructured data sets. For example, aspects of the disclosure relate to maintaining a database of historical transaction information of a plurality of users. Maintaining the database may include storing associations between users, previously executed funds transfers, previous contextual information of the funds transfers, or the like. Further, aspects of the disclosure relate to receiving unstructured data and therein both identifying a user of the database of historical transaction information that is associated with the data as well as identifying contextual information of the data. Using this historical transaction information and contextual information, aspects of the disclosure relate to determining a complete set of payment details for the data, such that a user may only need to review or approve the payment details (e.g., rather than the user explicitly providing any payment details) for the computing system to successfully execute the funds transfer.

What is claimed is:

1. A method comprising:
   maintaining, by a computing system, historical transaction information associated with each of a plurality of users, wherein the historical transaction information includes a plurality of records of funds transfers, and wherein each record of funds transfer includes historical contextual information of the respective funds transfer and historical payment details of the respective funds transfer;
   receiving, by the computing system and from a user device of a user of the plurality of users, data associated with a physical environment of a transaction, wherein the data includes at least one of video data, audio data, or photographic data;
   identifying, by the computing system, a user associated with the data, wherein the user is one of the plurality of users;
   identifying, by the computing system and based on the data, contextual information of the transaction, wherein the contextual information includes at least one of an identity of another of the plurality of users associated with the transaction or an environment or setting of the transaction;
   determining, by the computing system and based on the contextual information, a first set of payment details for the transaction, wherein the first set of payment details include a payment amount and one or more recipients of the transaction;
   identifying, by the computing system and based on the historical transaction information, one or more records of funds transfers of the user that include historical contextual information that is similar to the contextual information;
   determining, by the computing system and based on the one or more records of funds transfers, a second set of payment details for the transaction, wherein the second set of payment details include one or more destination accounts associated with the one or more recipients of the transaction;
   transmitting, by the computing system and over a network, a set of preliminary payment details derived from the determined payment details for display on a user interface of the user device;
   receiving, by the computing system and in response to interactions with the user interface, a request to execute a funds transfer for the payment amount from a source account associated with the user to the one or more destination accounts; and
   executing, by the computing system and in response to receiving the request to execute the funds transfer, the funds transfer.

2. The method of claim 1, wherein determining payment details includes:
   receiving, by the computing system and over the network, information about one or more corrections to the set of preliminary payment details; and
   determining, further based on the information about one or more corrections made to the set of preliminary payment, the payment details for the transaction.

3. The method of claim 1, wherein determining payment details includes:
   transmitting, by the computing system and over a network, a set of preliminary contextual information;
   receiving, by the computing system and over the network, information about one or more corrections to the set of preliminary contextual information; and
   determining, further based on the information about one or more corrections made to the set of preliminary contextual information, the payment details for the transaction.

4. The method of claim 1, wherein the computing system determines the payment amount based on the historical transaction information.

5. The method of claim 1, wherein the computing system determines the one or more recipients based on the historical transaction information.

6. The method of claim 1, wherein executing the funds transfer includes:
   responsive to determining the payment details, outputting, by the computing system and over the network, information for the user interface that includes a prompt to execute the funds transfer.

7. The method of claim 1, further comprising:
   recording, by the computing system, information about the funds transfer and the contextual information of the data in the historical transaction information, wherein the information about the funds transfer and the contextual information include the payment amount and the one or more recipients.

8. The method of claim 7, further comprising:
   receiving, by the computing system, a new set of data associated with a new transaction, wherein the new set of data includes new contextual information;
   identifying, by the computing system, the user as associated with the new set of data;

determining, by the computing system and based on the new contextual information, that the payment details for the transaction apply to the new transaction; and performing, by the computing system and in response to determining that the payment details apply to the new transaction, a new funds transfer for the payment amount from the source account associated with the user to the one or more destination accounts associated with the one or more recipients.

9. The method of claim 1, further comprising identifying the contextual information by:

analyzing the data using spatial imagery recognition techniques;

analyzing the data using facial recognition techniques;

analyzing the data using optical character recognition techniques; and analyzing the data using speech recognition techniques.

10. The method of claim 1, where the data includes video data.

11. The method of claim 1, further comprising:

detecting, by the computing system, the creation of the data, and wherein receiving the data includes gathering the data in response to detecting the creation of the data.

12. The method of claim 1, wherein receiving the data associated with the physical environment of the transaction further comprises:

detecting, by the computing device, creation or existence of the data on the user device;

identifying, by the computing device, the data as relating to the transaction; and gathering, by the computing device and in response to the detection of the creation or existence of the data on the user device, the data from the user device.

13. A computing device comprising:

at least one processor; and a memory coupled to the processor, the memory storing instructions that, when executed, cause the at least one processor to:

maintain historical transaction information associated with each of a plurality of users, wherein the historical transaction information includes a plurality of records of funds transfers, and wherein each record of funds transfer includes historical contextual information of the respective funds transfer and historical payment details of the respective funds transfer;

receive, from a user device of a user of the plurality of users, data associated with a physical environment of a transaction, wherein the data includes at least one of video data, audio data, or photographic data;

identify a user associated with the data, wherein the user is one of the plurality of users;

identify based on the data, contextual information of the transaction, wherein the contextual information includes at least one of an identity of another of the plurality of users associated with the transaction or an environment or setting of the transaction;

determine, based on the contextual information, a first set of payment details for the transaction, wherein the first set of payment details include a payment amount and one or more recipients of the transaction;

identify, based on the historical transaction information, one or more records of funds transfers of the user that include historical contextual information that is similar to the contextual information;

determine, based on the one or more records of funds transfers, a second set of payment details for the transaction, wherein the second set of payment details include one or more destination accounts associated with the one or more recipients of the transaction;

transmit, over a network, a set of preliminary payment details derived from the determined payment details for display on a user interface of the user device;

receive, in response to interactions with the user interface, a request to execute a funds transfer for the payment amount from a source account associated with the user to the one or more destination accounts; and execute, in response to receiving the request to execute the funds transfer, the funds transfer.

14. The computing device of claim 13, wherein to determine the payment details, the memory further stores instructions that, when executed, cause the at least one processor to:

receive, over the network, information about one or more corrections to the set of preliminary payment details; and determine, further based on the information about one or more corrections made to the set of preliminary payment details, the payment details for the transaction.

15. The computing device of claim 13, wherein to determine the payment details the memory further stores instructions that, when executed, cause the at least one processor to:

transmit, over a network, a set of preliminary contextual information;

receive, over the network, information about one or more corrections to the set of preliminary contextual information; and determine, further based on the information about one or more corrections made to the set of contextual information, the payment details for the transaction.

16. The computing device of claim 13, the memory further storing instructions that, when executed, cause the at least one processor to receive a new set of data associated with a new transaction, wherein the new set of data includes new contextual information;

identify the user as associated with the new set of data;

determine, based on the new contextual information, that the payment details for the transaction apply to the new transaction; and perform, in response to determining that the payment details apply to the new transaction, a new funds transfer for the payment amount from the source account associated with the user to the one or more destination accounts associated with the one or more recipients.

17. A non-transitory computer-readable medium comprising instructions, that when executed, cause one or more processors of a computing device to:

maintain historical transaction information associated with each of a plurality of users, wherein the historical transaction information includes a plurality of records of funds transfers, and wherein each record of funds transfer includes historical contextual information of the respective funds transfer and historical payment details of the respective funds transfer;

receive, from a user device of a user of the plurality of users, data associated with a physical environment of a transaction, wherein the data includes at least one of video data, audio data, or photographic data;

identify a user associated with the data, wherein the user is one of the plurality of users;

identify based on the data, contextual information of the transaction, wherein the contextual information includes at least one of an identity of another of the plurality of users associated with the transaction or an environment or setting of the transaction;

determine, based on the contextual information, a first set of payment details for the transaction, wherein the first set of payment details include a payment amount and one or more recipients of the transaction;

identify, based on the historical transaction information, one or more records of funds transfers of the user that include historical contextual information that is similar to the contextual information;

determine, based on the one or more records of funds transfers, a second set of payment details for the transaction, wherein the second set of payment details include one or more destination accounts associated with the one or more recipients of the transaction;

transmit, over a network, a set of preliminary payment details derived from the determined payment details for display on a user interface of the user device;

receive, in response to interactions with the user interface, a request to execute a funds transfer for the payment amount from a source account associated with the user to the one or more destination accounts; and execute, in response to receiving the request to execute the funds transfer, the funds transfer.

18. The non-transitory computer-readable storage medium of claim 17, wherein the instructions that determine the payment details further comprise instructions that, when executed, cause the one or more processors to:

receive, over the network, information about one or more corrections to the set of preliminary payment details; and determine, further based on the information about one or more corrections made to the set of preliminary payment details, the payment details for the transaction.

19. The non-transitory computer-readable storage medium of claim 17, wherein the instructions that determine the payment details further comprise instructions that, when executed, cause the one or more processors to:

transmit, over a network, a set of preliminary contextual information;

receive, over the network, information about one or more corrections to the set of preliminary contextual information; and determine, further based on the information about one or more corrections made to the set of preliminary contextual information, the payment details for the transaction.

20. The non-transitory computer-readable storage medium of claim 17, further comprising instructions that, when executed, cause the one or more processors to:

receive a new set of data associated with a new transaction, wherein the new set of data includes new contextual information;

identify the user as associated with the new set of data;

determine, based on the new contextual information, that the payment details for the transaction apply to the new transaction; and perform, in response to determining that the payment details apply to the new transaction, a new funds transfer for the payment amount from the source account associated with the user to the one or more destination accounts associated with the one or more recipients.

* * * * *